United States Patent
Tsutsumi et al.

(10) Patent No.: US 10,381,676 B2
(45) Date of Patent: Aug. 13, 2019

(54) LAYER CELL, ASSEMBLED BATTERY INCLUDING LAYER CELL, AND METHOD FOR ASSEMBLING LAYER CELL

(71) Applicant: EXERGY POWER SYSTEMS, INC., Tokyo (JP)

(72) Inventors: Kaduo Tsutsumi, Tokyo (JP); Masateru Nakoji, Tokyo (JP)

(73) Assignee: EXERGY POWER SYSTEMS, INC., Tokyo (JP)

( * ) Notice: Subject to any disclaimer, the term of this patent is extended or adjusted under 35 U.S.C. 154(b) by 61 days.

(21) Appl. No.: 15/835,559

(22) Filed: Dec. 8, 2017

(65) Prior Publication Data
US 2018/0102566 A1    Apr. 12, 2018

Related U.S. Application Data

(62) Division of application No. 14/114,933, filed as application No. PCT/JP2012/081004 on Nov. 29, 2012, now Pat. No. 9,876,251.

(30) Foreign Application Priority Data

Dec. 19, 2011   (JP) .................................. 2011-276586

(51) Int. Cl.
   *H01M 10/04*   (2006.01)
   *H01M 4/75*    (2006.01)
   (Continued)

(52) U.S. Cl.
   CPC .......... *H01M 10/0422* (2013.01); *C25B 1/02* (2013.01); *H01M 4/75* (2013.01); *H01M 10/04* (2013.01);
   (Continued)

(58) Field of Classification Search
   CPC .... H01M 10/0422; H01M 4/75; H01M 10/04; H01M 4/383; H01M 4/50; C25B 1/02
   See application file for complete search history.

(56) References Cited

U.S. PATENT DOCUMENTS 3,116,172 A   12/1963   Wilke
3,514,331 A   5/1970    Cupp
(Continued)

FOREIGN PATENT DOCUMENTS

EP   2012378 A2    1/2009
JP   05-217607 A   8/1993
(Continued)

OTHER PUBLICATIONS

B. Choi et al., "Development of NiMH-based Fuel Cell/Battery(FCB) system: Characterization of Ni (OH)2/MnO2 positive electrode for FCB", Journal of Power Sources, 2009. 12. 01, vol. 194 No. 2, pp. 1150-1155; Cited in ISR.
(Continued)

*Primary Examiner* — Helen Oi K Conley
(74) *Attorney, Agent, or Firm* — Westerman, Hattori, Daniels & Adrian, LLP

(57) ABSTRACT

A layer cell includes an outer casing, a positive electrode, a negative electrode, a separator disposed between the positive electrode and the negative electrode, and an electrically conductive current collector passing through the positive electrode, the negative electrode and the separator in an axial direction of the outer casing. The positive electrode, the negative electrode and the separator are stacked in the axial direction of the outer casing. A first electrode which is one of the positive electrode and the negative electrode is in contact with an inner surface of the outer casing, but is not in contact with the current collector. A second electrode which is the other electrode is not in contact with the outer casing, but is in contact with the current collector. An outer
(Continued)

edge of the second electrode is covered with the separator. A peripheral edge of a hole, through which the current collector passes, in the first electrode is covered with the separator.

1 Claim, 9 Drawing Sheets

(51) Int. Cl.
    *C25B 1/02*     (2006.01)
    *H01M 4/38*     (2006.01)
    *H01M 4/50*     (2010.01)

(52) U.S. Cl.
    CPC .............. *H01M 4/383* (2013.01); *H01M 4/50* (2013.01); *Y10T 29/4911* (2015.01)

(56) References Cited

U.S. PATENT DOCUMENTS

| | | |
|---|---|---|
| 5,173,376 A | 12/1992 | Page et al. |
| 2003/0219650 A1 | 11/2003 | Saruwatari et al. |

FOREIGN PATENT DOCUMENTS

| | | |
|---|---|---|
| JP | 2000-048854 A | 2/2000 |
| JP | 200-268854 A | 9/2000 |
| JP | 2002-198044 A | 7/2002 |
| WO | 2007/121964 A2 | 11/2007 |
| WO | 2008/099609 A1 | 8/2008 |
| WO | 2013/042640 A1 | 3/2013 |

OTHER PUBLICATIONS

U.S. Notice of Allowance dated Sep. 11, 2017, issued in U.S. Appl. No. 14/114,933. (9 pages).
International Search Report for PCT/JP2012/081004, dated Jan. 15, 2013.
Supplementary European Search Report issued in counterpart European Patent Application No. 12867801.1 (3 pages).
Office Action dated Sep. 2, 2015, issued in counterpart Chinese Patent Application No. 201280047225.1. (5 pages).
(http://batteryuniversity.com/learn/article/serial_and_parallel_battery_configurations).
U.S. Non-Final Office Action dated Dec. 30, 2016, issued in U.S. Appl. No. 14/114,933. (9 pages).
U.S. Final Office Action dated Mar. 30, 2017, issued in U.S. Appl. No. 14/114,933. (6 pages).

LAYER CELL, ASSEMBLED BATTERY INCLUDING LAYER CELL, AND METHOD FOR ASSEMBLING LAYER CELL

This application is a divisional of U.S. application Ser. No. 14/114,933 filed on Oct. 31, 2013, which is a U.S. national stage application of International Application No. PCT/JP2012/081004, filed on Nov. 29, 2012, which is based upon and claims the benefits of priority from Japanese Patent Application No. 2011-276586 filed on Dec. 19, 2011, the entire contents of which are incorporated herein by reference.

TECHNICAL FIELD

The present invention relates to a layer cell. Specifically, the present invention relates to a layer cell with improved cooling performance, an assembled battery including the layer cell, and a method for assembling the layer cell.

BACKGROUND ART

Electrode structures of a secondary cell are mainly classified into two types, i.e., a spiral-wound type and a layer type. In a cell having the spiral-wound type electrode structure (a spiral-wound cell; refer to, for example, Patent Literature 1), a positive electrode and a negative electrode which are spirally wound with a separator interposed therebetween are housed in a cell case. In a cell having the layer type electrode structure (a layer cell), an electrode group including a positive electrode and a negative electrode which are alternately stacked with a separator interposed therebetween is housed in a cell case. Patent Literature 2 discloses a cylindrical-type cell in which disc-shaped electrodes are stacked. Patent Literature 3 discloses a rectangular-type cell in which rectangular sheet-shaped electrodes are stacked.

CITATION LIST

Patent Literature

Patent Literature 1: JP 2002-198044 A
Patent Literature 2: JP 2000-48854 A
Patent Literature 3: WO 2008/099609 A

SUMMARY OF INVENTION

Technical Problem

With regard to the spiral-wound cell, the separator with low thermal conductivity is provided in a multilayered manner between the surface and center of the cell. As the result, even when a surface temperature of the cell case is close to an ambient temperature, a temperature of a portion around the center of the spiral-wound cell becomes considerably high.

The cylindrical-type layer cell disclosed in Patent Literature 2 has a structure to collect electricity in such a manner that the stacked electrodes come into contact with terminals, respectively. In the course of assembling the cylindrical-type layer cell, consequently, there is a possibility of infant failures due to a short circuit between the positive electrode and the negative electrode. Further, the electrode repeatedly contracts and expands by the repetition of charge and discharge. As the result, there is a possibility of secular failures due to the deformation and displacement of the electrode and the short circuit between the positive electrode and the negative electrode.

The present invention has been devised to solve the problems described above, and an object thereof is to restrain temperature rise inside a cell and to prevent a short circuit between electrodes.

Solution to Problem

In order to achieve the object described above, a layer cell according to the present invention includes: a tubular outer casing; a positive electrode; a negative electrode; a separator disposed between the positive electrode and the negative electrode; and an electrically conductive current collector passing through the positive electrode, the negative electrode and the separator in an axial direction of the outer casing. Herein, the positive electrode, the negative electrode and the separator are stacked in the axial direction of the outer casing. A first electrode which is one of the positive electrode and the negative electrode comes into contact with an inner surface of the outer casing so as to be electrically connected to the inner surface of the outer casing, but is not in contact with the current collector. A second electrode which is the other one of the positive electrode and the negative electrode is not in contact with the inner surface of the outer casing, but comes into contact with the current collector so as to be electrically connected to the current collector. An outer edge of the second electrode is covered with the separator. A peripheral edge of a hole, through which the current collector passes, in the first electrode is covered with the separator.

According to this configuration, the outer casing is made of a metal, and serves as a current collector terminal of the first electrode. An outward dimension of the first electrode is slightly larger than an inward dimension of the tubular outer casing, so that the entire outer periphery of the first electrode or a part of the outer periphery is in contact with the inner surface of the outer casing. When the first electrode is put into the outer casing under pressure, the first electrode firmly comes into contact with the outer casing. Thus, the first electrode is connected to the outer casing with thermally small resistance. Therefore, this configuration effectively acts on the cooling of the first electrode.

Herein, the outward dimension of the electrode refers a dimension from a graphic center to an outer periphery of a sheet-shaped electrode. In a case of a disc-shaped electrode, an outward dimension is referred to as an outer diameter. Likewise, the inward dimension of the outer casing refers a dimension between a graphic center at a vertical section of the tubular outer casing in the axial direction and the inner surface of the outer casing. In a case of a cylindrical outer casing, an inward dimension is referred to as an inner diameter.

The outward dimension of the second electrode is smaller than the inward dimension of the tubular outer casing, so that the second electrode does not come into contact with the outer casing. Accordingly, the second electrode is isolated from the outer casing.

Heat generated from the first electrode is directly transferred to the outer casing. Heat generated from the second electrode is transferred to the first electrode through the separator.

An overall heat transfer coefficient ($U_1$) of a spiral-wound cell is represented by Mathematical Formula 1 as will be described later. On the other hand, an overall heat transfer coefficient ($U_2$) of the layer cell according to the present invention is represented by Mathematical Formula 2. It is apparent from a comparison between the two coefficients that there is a large difference with regard to the term of a winding number n. In the spiral-wound cell, as the winding number n becomes larger, the overall heat transfer coefficient becomes smaller. Detailed description using substitution of specific numerical values will be given in the following embodiments.

In the layer cell according to the present invention, as described above, there is no necessity of a pipe or a heatsink for feeding a coolant into the cell in order to restrain the temperature inside the cell. Accordingly, the structure of the layer cell according to the present invention is compact. In the layer cell according to the present invention, moreover, it is possible to restrain temperature rise inside the cell easily by cooling the surface of the outer casing.

Each of the positive electrode, the negative electrode and the separator has a hole formed on the center thereof, for allowing the current collector to pass therethrough. The rod-shaped current collector passes through the holes. A diameter of the hole of the first electrode is larger than an outward dimension of the rod-shaped current collector. Therefore, the first electrode does not come into contact with the current collector. A diameter of the hole of the second electrode is smaller than the outward dimension of the rod-shaped current collector. Therefore, the second electrode comes into contact with the current collector and is electrically connected to the current collector. The current collector is made of a metal and serves as a current collector terminal of the second electrode. Moreover, the current collector is preferably a round rod, but may be a rectangular rod.

With regard to the layer cell according to the present invention, further, in the state that the electrodes and the separator are stacked, the outer edge of the second electrode is covered with the separator, and the peripheral edge of the hole, through which the current collector passes, in the first electrode is covered with the separator. Therefore, the first electrode and the second electrode are separated from each other by the separator with reliability at the outer edge of the second electrode and the peripheral edge of the hole in the first electrode. Accordingly, the electrodes do not come into contact with each other at the outer edge of one of the electrodes and the peripheral edge of the hole in the other electrode because of the deformation of the electrodes. In the case of the disc-shaped electrode, the outer diameter of the separator is larger than the outer diameter of the second electrode. In the case where the current collector is a round rod, moreover, the hole diameter of the separator is smaller than the hole diameter of the first electrode.

In the layer cell according to the present invention, the first electrode is enclosed with a bag-shaped first separator in a state that an outer edge of the first electrode is exposed at the outside of the first separator, and the second electrode is enclosed with a bag-shaped second separator in a state that a peripheral edge of a hole, through which the current collector passes, in the second electrode is exposed at the outside of the second separator. According to this configuration, since the separators have the bag shape, the separators prevent a short circuit between the electrodes from occurring because of dust or foreign matters derived from the electrodes.

In the layer cell according to the present invention, the current collector has a side surface on which a groove is formed, a diameter of the narrowest portion of the current collector is larger than the diameter of the hole, through which the current collector passes, in the second electrode, and a diameter of the thickest portion of the current collector is smaller than the diameter of the hole, through which the current collector passes, in the first electrode.

There is a possibility that, at the time of assembly of the electrodes, the coupling between the current collector and the electrode is loosened and the tight contact between the current collector and the electrode is hampered. In order to solve this problem, the layer cell according to the present invention includes the current collector on which a screw groove is formed. According to this configuration, it becomes possible to maintain the state that the second electrode is firmly fitted into the current collector by the screw groove formed on the current collector. This configuration prevents the coupling between the electrode and the current collector from being loosened at the time of layer cell assembling work.

In the layer cell according to the present invention, the negative electrode contains a hydrogen storage alloy. In the layer cell according to the present invention, further, each of the positive electrode and the negative electrode is an electrode that is charged and discharged, and is also an electrode that applies electrolysis to an electrolyte retained in the layer cell with an electric current fed from the outside. According to this configuration, each of the positive and negative electrodes plays a role of an electrode that is charged and discharged in a secondary cell and a role of an electrode that generates hydrogen gas.

In the layer cell according to the present invention, preferably, a charge-capacity of the negative electrode is smaller than a charge-capacity of the positive electrode. The layer cell is a so-called negative electrode regulation-type cell. Herein, these charge-capacities are simply referred to as a positive electrode capacity and a negative electrode capacity, respectively, in some cases.

The layer cell according to the present invention further includes a hydrogen storage chamber disposed inside the outer casing, for storing hydrogen gas generated from the negative electrode. Herein, the hydrogen storage chamber may be an independent space. Moreover, the hydrogen storage chamber is not an independent space, but may be formed on a clearance in the electrode and a clearance in the separator.

In the negative electrode regulation-type layer cell, as the charge progresses, the negative electrode is fully charged before the positive electrode is fully charged. At the overcharge in which the charge is continued from the full charge state, hydrogen gas is generated from the negative electrode (see Reaction Formula (1)).

$$H^+ + e^- \rightarrow \tfrac{1}{2}H_2 \tag{1}$$

The hydrogen gas generated from the negative electrode is stored in the hydrogen storage alloy of the negative electrode to serve as an energy source at the time of discharge. In a case of a positive electrode made of nickel oxyhydroxide, a reaction formula at the time of discharge is Reaction Formula (2).

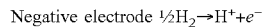

Negative electrode $\tfrac{1}{2}H_2 \rightarrow H^+ + e^-$

Positive electrode $NiOOH + e^- + H^+ \rightarrow Ni(OH)_2$

$$\text{Whole } NiOOH + \tfrac{1}{2}H_2 \rightarrow Ni(OH)_2 \tag{2}$$

Since the hydrogen storage alloy is expensive, the negative electrode significantly affects on a price of the cell. In a normal positive electrode regulation-type secondary cell, an amount of materials for a negative electrode is 1.5 to 2 times as large as that for a positive electrode. However, the layer cell according to the present invention is allowed to reduce the amount of expensive materials for the negative electrode. Therefore, it is possible to obtain an inexpensive layer cell.

In the layer cell according to the present invention, the negative electrode is charged in such a manner that the hydrogen storage alloy contained in the negative electrode stores the hydrogen gas stored in the hydrogen storage chamber. According to this configuration, the negative electrode is charged with the hydrogen gas generated by the overcharge. Accordingly, the hydrogen gas is effectively utilized. The hydrogen storage alloy contained in the negative electrode acts as a so-called catalyst.

In the layer cell according to the present invention, preferably, the positive electrode contains manganese dioxide. Heretofore, a manganese dioxide positive electrode has been used for a primary cell to be known as a manganese dioxide-zinc cell, but has not been used for a secondary cell. The reason therefor is as follows. That is, when the manganese dioxide positive electrode is discharged until manganese hydroxide, trimanganese tetraoxide $Mn_3O_4$ is generated, which is not able to charge again. However, the inventors of the present invention have found that irreversible trimanganese tetraoxide is not generated by contacting the positive electrode with oxygen. The inventors of the present invention have succeeded in adopting manganese dioxide as a material for a positive electrode of a secondary cell by supplying oxygen to the circumference of the positive electrode.

In the layer cell according to the present invention, the outer casing has a side portion formed into a cylindrical shape. Moreover, the outer casing has bulging portions that have a dome shape at axial two ends thereof, and the hydrogen storage chamber is provided in each of the bulging portions.

When the charge is continued after the negative electrode is fully charged, hydrogen gas is generated from the negative electrode. The generated hydrogen gas is stored in the hydrogen storage chamber, is stored in the negative electrode at the time of discharge, and is effectively utilized. Thus, it becomes possible to reduce an amount of expensive materials for a negative electrode. Therefore, it is possible to manufacture an inexpensive layer cell. The structure that each of the two ends of the cylindrical can bulges in a dome shape is suitable for storage of high-pressure hydrogen gas.

An assembled battery includes a plurality of layer cells according to the present invention, and the layer cells are connected to each other via a columnar metal fitting. Herein, in each of the layer cells, the outer casing has a cylindrical body portion made of a metal, and lid portions for covering openings formed at axial two ends of the body portion, and the current collector passes through the lid portions. The metal fitting has a top surface and a bottom surface each having a connection cavity formed thereon. The end of the current collector in one of the layer cells is fittable into the connection cavity formed on the top surface of the metal fitting. The end of the current collector in the different one of the layer cells adjoining the layer cell is fittable into the connection cavity formed on the bottom surface of the metal fitting, with an insulator interposed between the end and the connection cavity. The bottom surface of the metal fitting is electrically connected to the outer casing in the different layer cell.

The bottom surface and top surface of the metal fitting are capable of coming into surface contact with the lid portions of the adjoining layer cells. The insulator is interposed between the cavity formed on the bottom surface of the metal fitting and the current collector. In the two layer cells adjoining each other, therefore, the current collectors are isolated from each other. The current collector in one of the layer cells and the outer casing in the adjacent layer cell are connected to each other via the metal fitting. As the result, the adjoining layer cells are connected in series via the metal fitting.

An assembled battery includes a plurality of layer cells according to the present invention. Herein, the outer casing in each of the layer cells has a one-end closed container having a rectangular section, and a lid member for covering an opening of the container. The layer cells are connected to each other such that the container in one of the layer cells and the lid member in the different one of the layer cells adjoining the layer cell are in surface contact with each other.

According to this configuration, the lid member in one layer cell and the bottom of the container in the adjacent layer cell come into contact with each other, so that the two layer cells are stacked and electrically connected in series. It is possible to raise an output voltage from an assembled battery by connecting a large number of layer cells as described above.

A method for assembling the layer cell according to the present invention includes: a first step of previously preparing a current collector having a side surface on which a screw groove is formed, and a round rod having the same outer diameter as a diameter of a root of the screw groove on the current collector; a second step of assembling an electrode group in such a manner as to sequentially insert a positive electrode and a negative electrode into the round rod with a separator interposed between the positive electrode and the negative electrode and stack the electrodes; a third step, to be carried out subsequent to the second step, of disposing presser plates on two ends of the electrode group to hold the electrode group and applying pressure to the presser plates to compress the electrode group; a fourth step of pulling out the round rod while maintaining the compressed state; a fifth step of pushing the current collector instead of the round rod into the electrode group while rotating the current collector and, then, screwing the current collector into a screw hole formed on the center of the presser plate to assemble an electrode assembly while maintaining the compressed state of the electrode group; a sixth step of putting the electrode assembly into the outer casing under pressure; a seventh step of deaerating the outer casing; an eighth step of injecting an electrolyte into the outer casing; and a ninth step, to be carried out subsequent to the eighth step, of attaching a lid to the outer casing to seal the outer casing.

Advantageous Effects of Invention

According to the present invention, temperature rise inside a cell is restrained without a necessity of redundant space for cooling. Further, the layer cell according to the present invention allows the prevention of a short circuit between electrodes.

DESCRIPTION OF EMBODIMENTS

Figure 1:
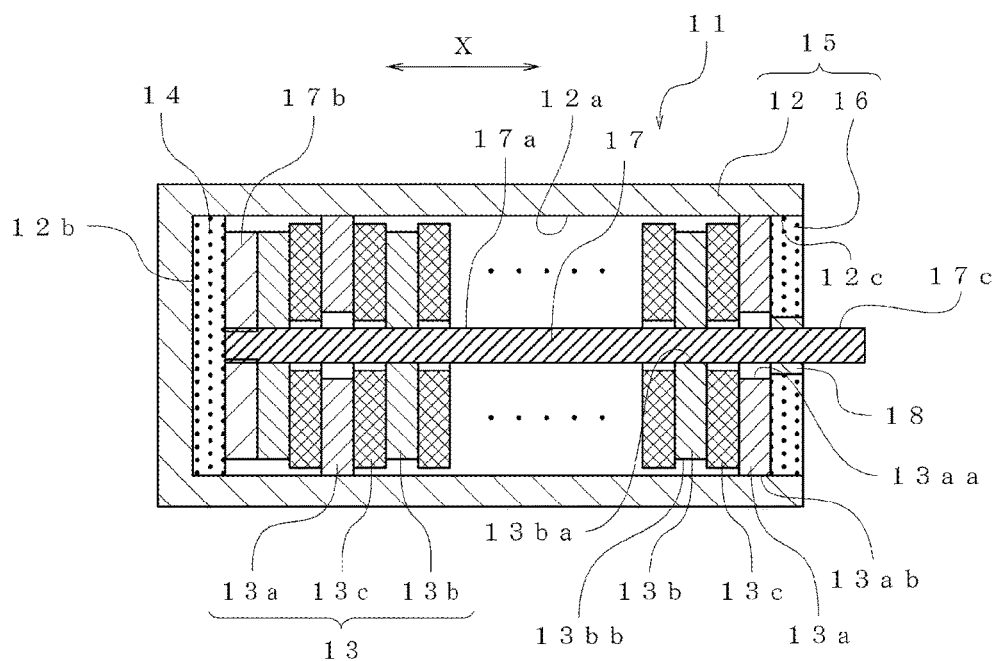
FIG. 1 is a diagram illustrating a schematic configuration of a cylindrical-type layer cell according to a first embodiment, which particularly illustrates an axial section.

With reference to the drawings, hereinafter, description will be given of embodiments of the present invention; however, the present invention is not intended to be limited to these embodiments.

Prior to the description of the respective embodiments of the present invention, first, description will be given of an example of a secondary cell to which the present invention is applied. The secondary cell is not limited to types to be described in the respective embodiments, and may be secondary cells such as a nickel-iron cell, a zinc-manganese cell and a nickel-cadmium cell.

<Nickel-Metal Hydride Cell>

A negative electrode contains, as a principal material, a hydrogen storage alloy, e.g., lanthanum-nickel. Nickel oxyhydroxide was used as an active material of a positive electrode. An alkaline aqueous solution such as a KOH aqueous solution, which is typically used in a nickel-metal hydride cell, was used as an electrolyte to be retained in a separator.

The negative electrode to be used herein is obtained as follows. That is, a paste obtained by adding a solvent to a hydrogen storage alloy, an electrically conductive filler and a binder was applied onto a substrate so as to be formed into a sheet shape, and then was cured. Likewise, the positive electrode to be used herein is obtained as follows. That is, a paste obtained by adding a solvent to a positive electrode active material, an electrically conductive filler and a binder was applied onto a substrate so as to be formed into a sheet shape, and then was cured.

The electrically conductive filler to be used herein was a carbon particle. The binder to be used herein was a thermoplastic resin which dissolves in a water-soluble solvent. The substrate to be used herein was a foamable nickel sheet. The separator to be used herein was a polypropylene fiber.

<Manganese Dioxide Cell>

A negative electrode contains a hydrogen storage alloy. A positive electrode contains manganese dioxide as an active material. The positive electrode and negative electrode to be used herein were obtained as follows. That is, a paste obtained by adding a solvent to an active material, an electrically conductive filler and a binder was applied onto a nickel substrate so as to be formed into a sheet shape, and then was cured. The electrically conductive filler, binder, separator and electrolyte to be used herein were the same as those in the nickel-metal hydride cell.

In the positive electrode of the manganese dioxide cell, manganese dioxide $MnO_2$ is changed to manganese oxyhydroxide MnOOH, and then is changed to manganese hydroxide $Mn(OH)_2$ in the course of discharge. When the positive electrode is discharged until manganese hydroxide, trimanganese tetraoxide $Mn_3O_4$ is generated, which is not able to charge again. However, even when manganese dioxide is subjected to the oxidation by the discharge, the contact with oxygen allows manganese oxyhydroxide to be returned to manganese dioxide. Thus, manganese dioxide is not changed until manganese hydroxide, so that irreversible trimanganese tetraoxide is not generated. Hence, the positive electrode contains no trimanganese tetraoxide or contains trimanganese tetraoxide of less than 5% at the most. Oxygen gas generated from the positive electrode at the time of overcharge is stored in the cell and is used.

<Lithium-Ion Cell>

With regard to a negative electrode, first, lithium titanate, carboxymethylcellulose (CMC) and Ketjen Black (KB) were mixed, so that a slurry mixture was prepared. Next, this mixture was applied onto a stainless steel foil, was temporarily dried, and then was subjected to heat treatment. Thus, the negative electrode was obtained.

With regard to a positive electrode, first, lithium iron phosphate, CMC, active carbon and KB were mixed, so that a slurry mixture was prepared. Next, this mixture was applied onto a stainless steel foil, was temporally dried, and then was subjected to heat treatment. Thus, the positive electrode was obtained.

A separator to be used herein was a microporous film made of polypropylene. An electrolyte to be used herein was 1 mol/L $LiPF_6$/EC:DEC. An electroconductive agent to be used herein was KB.

A binder to be used herein was CMC. A current collector to be used herein was stainless steel.

<Nickel-Zinc Cell>

A nickel-zinc cell includes: a negative electrode containing zinc or a zinc compound; a positive electrode containing nickel oxide, nickel hydroxide or nickel oxyhydroxide; and an electrolyte containing phosphate in a range from 0.025 M to 0.25 M and free alkali in a range from 4 M to 9 M.

First Embodiment

FIG. 1 is a section view schematically illustrating, in an axial direction, a cylindrical-type layer cell (hereinafter, simply referred to as a layer cell) according to a first embodiment of the present invention. As illustrated in FIG. 1, the layer cell 11 includes, as main constituent elements, an outer casing 15, a current collector 17, and electrode units 13 each housed in the outer casing. The outer casing 15 is configured with a one-end closed cylindrical can 12, and a disc-shaped lid member 16 attached to an opening 12*c* of the cylindrical can. Each of the cylindrical can 12 and the lid member 16 is made of iron, but may be made of a different metal. An outer diameter of the lid member 16 is slightly larger than an inner diameter of the opening 12*c* of the cylindrical can. After the electrode units 13 are housed in the outer casing 15, the lid member 16 is tightly fitted at the opening 12*c* of the cylindrical can.

Each of the electrode units 13 is configured with a positive electrode 13*a* containing a positive electrode active material, a negative electrode 13*b* containing a hydrogen storage alloy, and a separator 13*c* disposed between the positive electrode 13*a* and the negative electrode 13*b*, for allowing ions to pass therethrough, but preventing electrons from passing therethrough. The electrode units 13 are stacked in an axial direction (a direction X in FIG. 1) of the cylindrical can 12 and are housed in the outer casing 15. Herein, an electrolyte (not illustrated) is retained in the separator 13*c*. Each of the positive electrode 13*a*, the negative electrode 13*b* and the separator 13*c* has a disc shape with a hole formed at the center. An outer diameter of the negative electrode 13*b* is smaller than an inner diameter of the cylindrical can 12, so that an outer edge 13*bb* of the negative electrode is not in contact with an inner surface 12*a* of the cylindrical can. On the other hand, an outer diameter of the positive electrode 13*a* is larger than the inner diameter of the cylindrical can 12, so that an outer edge 13*ab* of the positive electrode is in contact with the inner surface 12*a* of the cylindrical can, and the positive electrode 13*a* is electrically connected to the cylindrical can 12. Preferably, the outer diameter of the positive electrode 13*a* is larger by 100 μm than the inner diameter of the cylindrical can 12.

The current collector 17 is made of nickel-plated iron, and has a rod-shaped shaft portion 17*a* and a hold portion 17*b* formed at one end of the shaft portion 17*a*. The nickel plating treatment prevents the current collector 17 from being corroded by the electrolyte contained in the separator 13*c*. The shaft portion 17*a* of the current collector passes through the center of the electrode unit 13 including the positive electrode 13*a*, the negative electrode 13*b* and the separator 13*c*, in the axial direction (the direction X in FIG. 1) of the outer casing 15. A diameter of the hole formed on the center of the negative electrode 13*b* is smaller than an outer diameter of the shaft portion 17*a*. Accordingly, a peripheral edge 13*ba* of the hole of the negative electrode comes into contact with the shaft portion 17*a*, so that the negative electrode 13*b* is electrically connected to the current collector 17. On the other hand, a diameter of the hole formed on the center of the positive electrode 13*a* is larger than the outer diameter of the shaft portion 17*a*. Accordingly, a peripheral edge 13*aa* of the hole of the positive electrode does not come into contact with the shaft portion 17*a*, so that the positive electrode 13*a* is electrically isolated from the current collector 17.

The electrode units 13 are disposed to be sequentially stacked on the hold portion 17*b* of the current collector. The hold portion 17*b* prevents the electrode unit 13 from being disengaged from the end of the current collector 17 during assembly. The hold portion 17*b* has a disc shape. The hold portion 17*b* is disposed on a bottom 12*b* of the cylindrical can with an insulating plate 14 interposed between the hold portion 17*b* and the bottom 12*b*. The insulating plate 14 prevents an electrical short circuit due to direct contact of the current collector 17 with the cylindrical can 12. The opposite end of the shaft portion 17*a* to the hold portion 17*b* is supported by a shaft support 18 provided on the center of the lid member 16. The shaft support 18 is made of an insulative material in order to prevent an electrical short circuit between the lid member 16 and the shaft portion 17*a*. The shaft portion protruding from the lid member 16 serves as a positive electrode terminal 17*c*. The cylindrical can 12 serves as a negative electrode terminal.

Next, description will be given of a relation between the sizes of the positive electrode 13*a*, negative electrode 13*b* and separator 13*c* and the sizes of the outer casing 15 and current collector 17. An outer edge of the separator 13*c* is covered with the positive electrode 13*a* (first electrode), and the outer edge of the negative electrode 13*b* (second electrode) is covered with the separator 13*c*. Moreover, the peripheral edge of the hole, through which the current collector 17 passes, in the positive electrode 13*a* is covered with the separator 13*c*, and the peripheral edge of the hole, through which the current collector 17 passes, in the separator 13*c* is covered with the negative electrode 13*b*.

In other words, the outer diameter of the separator 13*c* is larger than the outer diameter of the negative electrode 13*b* (second electrode). Therefore, the positive electrode 13*a* and the negative electrode 13*b* are completely separated from each other by the separator 13*c* in the vicinity of an inner circumferential surface of the outer casing 15. Thus, the electrodes do not come into contact with each other even when becoming deformed. Further, the diameter of the hole formed on the center of the separator 13*c* is smaller than the diameter of the hole formed on the center of the positive electrode 13*a*. Therefore, the positive electrode 13*a* and the negative electrode 13*b* are completely separated from each other by the separator 13*c* in the vicinity of an outer circumferential surface of the current collector 17. Thus, the electrodes do not come into contact with each other even when becoming deformed. Moreover, the outer diameter of the separator 13*c* is smaller than the outer diameter of the positive electrode 13*a* (first electrode). Therefore, the separator 13*c* is not interposed between the positive electrode 13*a* and the cylindrical can 12. Further, the diameter of the hole formed on the center of the separator 13*c* is larger than the diameter of the hole formed on the center of the negative electrode 13*b*. Therefore, the separator 13*c* is not interposed between the negative electrode 13*b* and the current collector 17.

The outer edge of the positive electrode 13*a* is brought into contact with the inner surface, which serves as a current collector terminal, of the outer casing 15, so that electricity and heat generated from the positive electrode 13*a* can be transmitted to the outer casing 15 with good efficiency. Likewise, the peripheral edge of the hole, through which the current collector passes, in the negative electrode 13*b* is brought into contact with the current collector 17 serving as a current collector terminal, so that electricity generated from the negative electrode 13*b* can be transmitted to the current collector 17 with good efficiency.

The inventors of the present invention have adopted a cylindrical cell having a stacked structure as an electrode structure. Thus, the inventors of the present invention have allowed to transmit electricity and heat generated from electrodes to an outer casing and a current collector with good efficiency. Thereby, the inventors of the present invention have realized a layer cell with improved cooling performance and current collecting performance.

Next, description will be given of functions and effects of a cooling structure in the first embodiment.

The outer edge 13*ab* of the positive electrode is firmly pressed against the inner surface 12*a* of the cylindrical can and is in tight contact with the inner surface 12*a* of the cylindrical can. Heat generated from the positive electrode 13a is directly transferred to the cylindrical can 12. Moreover, heat generated from the negative electrode 13b is transferred to the positive electrode 13a via the separator 13c. The thin and single separator 13c does not hinder the heat transfer so much. As described above, heat generated from each of the electrodes 13a and 13b is transferred to the cylindrical can 12 at low heat resistance, so that temperature rise inside the layer cell is restrained.

Herein, description will be given of a difference in temperature rise between the layer cell according to the embodiment of the present invention and a conventional spiral-wound cell, on the basis of a calculation example. In the spiral-wound cell, an overall heat transfer coefficient (U1) is expressed by Mathematical Formula 1. In the layer cell, on the other hand, an overall heat transfer coefficient (U2) is expressed by Mathematical Formula 2.

$$U_1 = 1 \bigg/ \bigg\{ \frac{1}{h_0} + \frac{t}{k} + \bigg( \frac{1}{h_1} + \frac{t^*}{k^*} + \frac{1}{h_1} + \frac{t_s}{h_s} + \frac{1}{h_1} + \frac{t_-}{h_-} \bigg) n \bigg\}$$ [Mathematical Formula 1]

here, n; winding number, k, $k_+$, $k_-$, $k_s$; thermal conductivity, t, $t_+$, $t_-$, $t_s$; thickness, $h_0$, $h_1$; laminar film $$U_2 = 1 \bigg/ \bigg\{ \frac{1}{h_0} + \frac{t}{k} + \frac{1}{h_1} + \frac{t^*}{k^*} \bigg\}$$ [Mathematical Formula 2]

here, k, k*; thermal conductivity, t, t*; thickness, $h_0$, $h_1$; laminar film

Herein, calculation is made with regard to a 18650-type cell used as an example. The spiral-wound cell has the following specifications.

t=0.5 mm, $t_+=t_-=t_s=10$ μm, $k=k_+=k_-=40$ Wm$^{-2}$ deg$^{-1}$
$h_0=100$ Wm$^{-2}$ deg$^{-1}$, $h_1=1$ Wm$^{-2}$ deg$^{-1}$, $k_s=1$ Wm$^{-2}$ deg$^{-1}$,
n=9/0.03=300

Mathematical Formula 1 into which these values are substituted results in $U_1=0.0011$ Wm$^{-2}$ deg$^{-1}$.

On the other hand, the layer cell according to this embodiment has the following specifications.

$h_0=100$ Wm$^{-2}$ deg$^{-1}$, t=0.5 mm, k=40 Wm$^{-2}$ deg$^{-1}$
$h_1=10000$ Wm$^{-2}$ deg$^{-1}$, t*=0.009 m, k*=40 Wm$^{-2}$ deg$^{-1}$ Therefore, Mathematical Formula 2 into which these values are substituted results in $U_2=100$ WM$^{-2}$ deg$^{-1}$.

A comparison between the two examples indicates that the layer cell according to the embodiment of the present invention is more excellent in heat transfer by about 100000 times than the conventional spiral-wound cell.

Next, description will be given of a modification example of the first embodiment. Specifically, this modification example adopts bag-shaped separators.

Figure 2A:
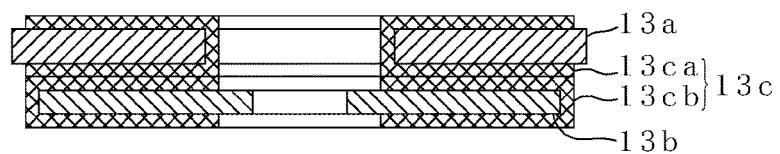
FIG. 2A is a section view illustrating a first electrode and a second electrode each enclosed with a bag-shaped separator.

FIG. 2A is a section view illustrating the electrodes enclosed with the bag-shaped separators. For the sake of simplification, FIG. 2A illustrates one positive electrode 13a and one negative electrode 13b. The positive electrode 13a is enclosed with the bag-shaped separator 13ca except the outer edge. Moreover, the negative electrode 13b is enclosed with the bag-shaped separator 13cb except the peripheral edge of the hole through which the current collector passes.

Figure 2B:
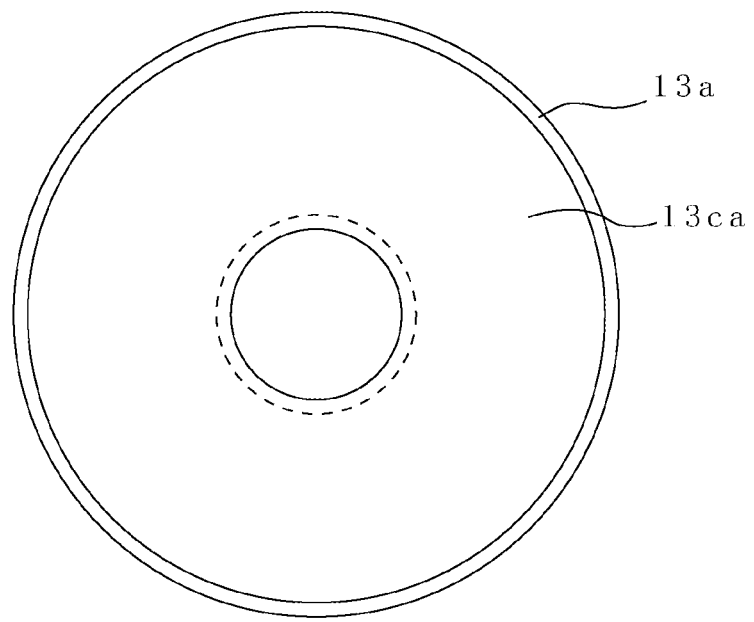
FIG. 2B is a plan view illustrating the first electrode enclosed with the bag-shaped separator.
Figure 2C:
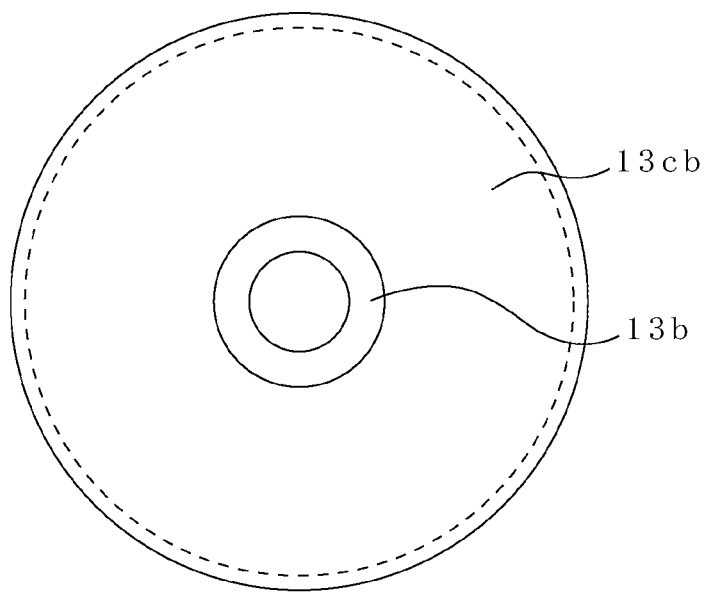
FIG. 2C is a plan view illustrating the second electrode enclosed with the bag-shaped separator.

FIG. 2B is a plan view illustrating the positive electrode 13a (first electrode) enclosed with the bag-shaped separator. FIG. 2C is a plan view illustrating the negative electrode 13b (second electrode) enclosed with the bag-shaped separator.

The positive electrode 13a is sandwiched between two separators each having an outer diameter which is smaller than the outer diameter of the positive electrode 13a and a hole diameter which is larger than the hole diameter of the positive electrode 13a, and the overlapping portions in the two separators (the edges of the holes) are bonded together by thermal welding. Thus, the positive electrode 13a enclosed with the bag-shaped separator 13ca is formed. The negative electrode 13b is sandwiched between two separators each having an outer diameter which is larger than the outer diameter of the negative electrode 13b and a hole diameter which is smaller than the hole diameter of the negative electrode 13b, and the overlapping portions in the two separators (the outer peripheral portions) are bonded together by thermal welding. Thus, the negative electrode 13b enclosed with the bag-shaped separator 13cb is formed.

Dust or foreign matters derived from the electrodes in the course of transporting the cell and the course of assembling the cell are trapped inside the bag-shaped separator. The bag-shaped separators prevent the dust or foreign matters derived from the electrodes from being interposed between the electrodes and between the electrode and the current collector terminal. Therefore, an internal short circuit does not occur. Further, the bag-shaped separators are prevented from being interposed between the positive electrode 13a and the cylindrical can 12 and between the negative electrode 13b and the current collector 17 because the separators are disposed out of the right place.

Second Embodiment

Figure 3:
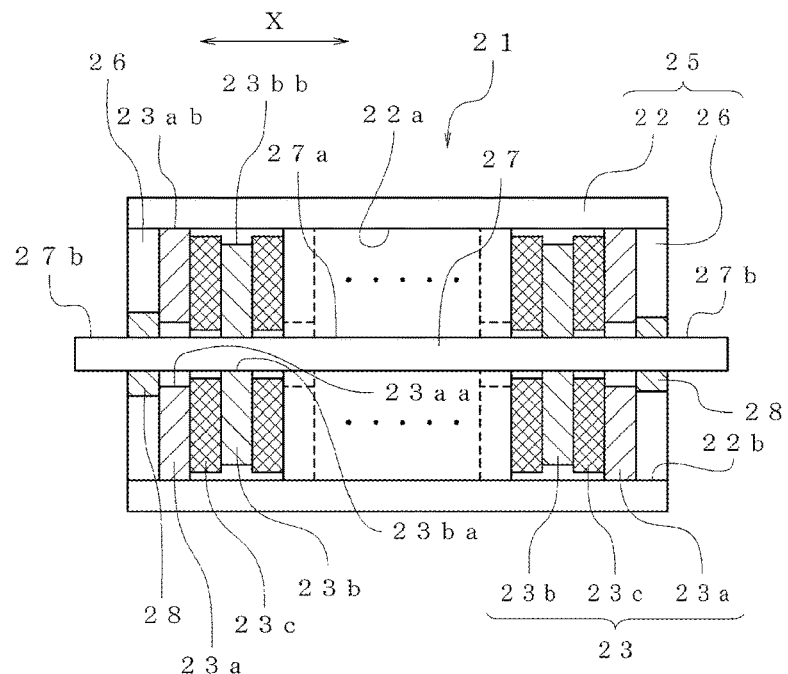
FIG. 3 is a diagram illustrating a schematic configuration of a pipe-type layer cell according to a second embodiment.

FIG. 3 is a section view schematically illustrating, in an axial direction, a pipe-type layer cell (hereinafter, simply referred to as a layer cell) according to a second embodiment of the present invention. As illustrated in FIG. 3, the layer cell 21 has almost the same structure as that of the layer cell 11 illustrated in FIG. 1 except part of an outer casing and part of a current collector. Specifically, the outer casing 25 is configured with a round pipe 22 and disc-shaped lid members 26 attached to openings 22b formed at two ends of the round pipe 22. The current collector 27 passes through the lid member 26 and is supported by the lid member 26.

Hereinafter, description will be mainly given of a difference between the layer cell 21 and the layer cell 11.

Electrode units 23 each of which is configured with a positive electrode 23a, a negative electrode 23b and a separator 23c are sequentially stacked in such a state that a shaft portion 27a of the current collector passes therethrough. The current collector 27 is supported by shaft supports 28 formed on the centers of the lid members 26, respectively, at two ends 27b thereof. Each of the shaft supports 28 is made of an insulative material in order to prevent an electrical short circuit between the lid member 26 and the current collector 27. Each of the ends 27b of the current collector protruding from the lid members 26 serves as a negative electrode terminal. The round pipe 22 serves as a positive electrode terminal.

Figure 4A:
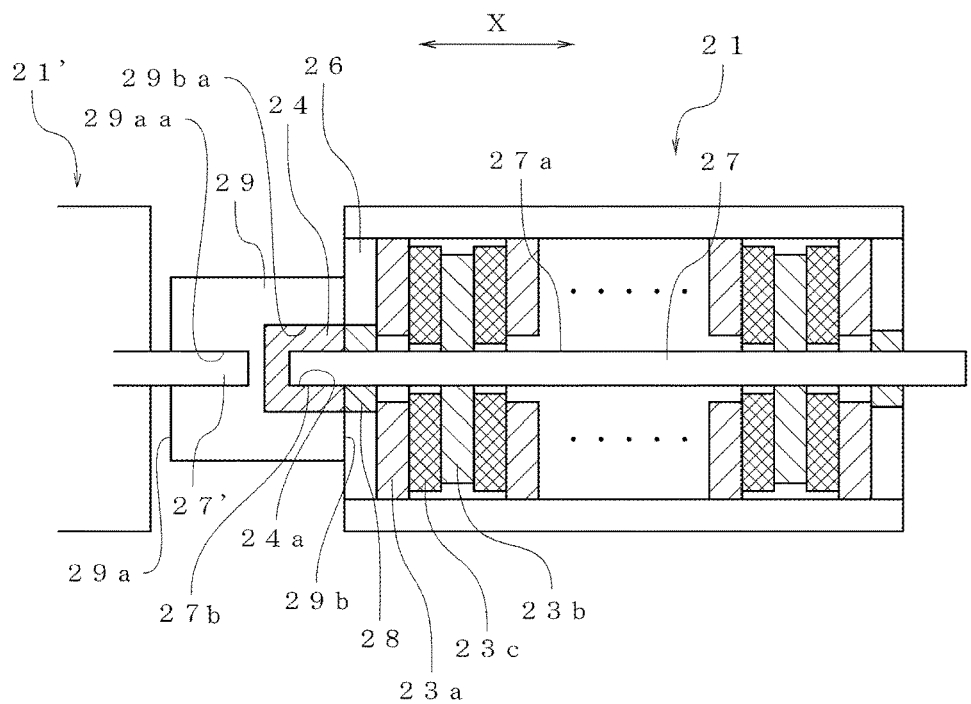
FIG. 4A is a diagram illustrating a schematic configuration in a state that a metal fitting is attached to the pipe-type layer cell.

Next, description will be given of an assembled battery including the layer cell 21. FIG. 4A illustrates a state that a metal fitting 29 is attached to the layer cell 21. The metal fitting 29 is disposed between the layer cell 21 and the adjacent layer cell 21' so as to be brought into surface contact with the lid member 26 of the layer cell 21. The metal fitting 29 is made of a column-shaped metal, but may be made of a prism-shaped metal. An axial direction of the metal fitting 29 corresponds with an axial direction (a direction X in FIG. 4A) of the current collector 27. The metal fitting 29 has a top surface 29a (the left side in the figure), and a cavity 29aa is formed on the center of the top surface 29a in a vertical direction to the top surface 29a. The cavity 29aa allows the current collector 27' of the adjacent layer cell 21' to be fitted thereinto. The metal fitting 29 also has a bottom surface 29b (the right side in the figure), and a cavity 29ba is formed on the center of the bottom surface 29b in a vertical direction to the bottom surface 29b. The cavity 29ba allows an insulating member 24 to be fitted thereinto. Moreover, a cavity 24a is formed on the center of the insulating member 24 in the vertical direction to the bottom surface 29b. The cavity 29a allows the shaft portion 27b of the current collector in the layer cell 21 to be fitted thereinto. The bottom surface 29b of the metal fitting comes into surface contact with the lid member 26 of the layer cell, so that the layer cell 21 and the adjacent layer cell 21' are electrically connected to each other via the metal fitting 29. Herein, the insulating member 24 prevents an electrical short circuit due to the contact of the current collector 27 with the outer casing 25.

Figure 4B:
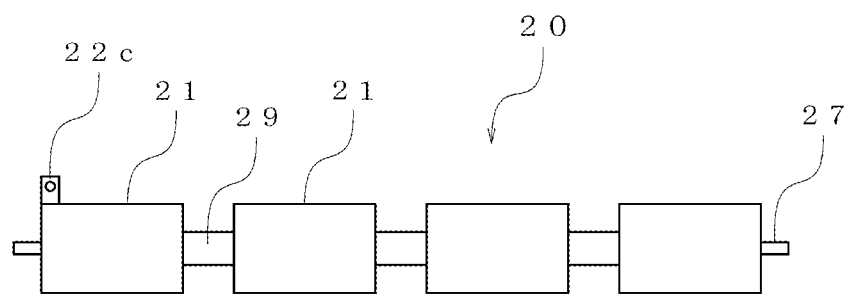
FIG. 4B is a diagram illustrating a configuration in a case where an assembled battery is configured with the pipe-type layer cell.

As illustrated in FIG. 4B, it is possible to obtain the assembled battery 20 in which the layer cells are connected in series, by coupling the adjoining layer cells 21 to each other using the metal fitting 29.

Third Embodiment

Figure 5:
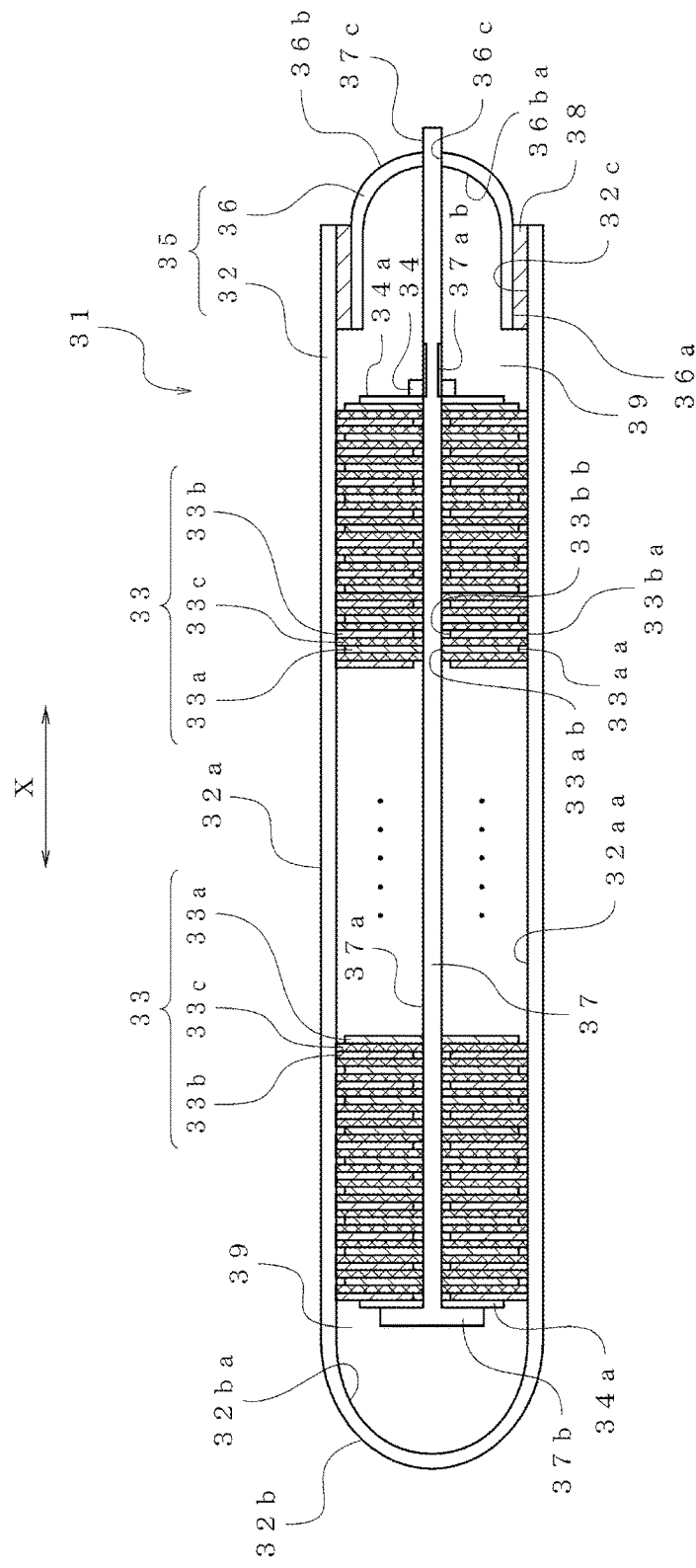
FIG. 5 is a diagram illustrating a schematic configuration of a capsule-type layer cell according to a third embodiment.

FIG. 5 is a section view schematically illustrating, in an axial direction, a capsule-type layer cell (hereinafter, simply referred to as a layer cell) according to a third embodiment of the present invention. The layer cell 31 includes, as main constituent elements, an outer casing 35, a current collector 37, and electrode units 33 each housed in the outer casing. The outer casing 35 is configured with a one end-closed cylindrical outer structural unit 32 and a lid member 36 attached to an opening 32c of the outer structural unit 32. Each of the outer structural unit 32 and the lid member 36 is made of nickel-plated iron, but may be made of a metal such as aluminum or titanium.

The outer structural unit 32 has a tubular side portion 32a and a bulging portion 32b that bulges in a dome shape at the bottom thereof, and the lid member 36 also has a tubular side portion 36a and a bulging portion 36b that bulges in a dome shape at the bottom thereof. An outer diameter of the side portion 36a of the lid member is smaller than an inner diameter of the opening 32c of the outer structural unit 32. The opening 32c is covered with the lid member 36 in such a direction that the bulging portion 36b bulges outward the opening 32c of the outer structural unit. The lid member 36 is bonded to the outer structural unit 32 by an insulating seal member 38. The insulating seal member 38 plays a role to electrically insulate the outer structural unit 32 from the lid member 36, and also plays a role to form a sealed space inside the outer casing 35 by the seal of the bonded portion. The insulating seal member 38 is made of a material having an insulating property and a sealing property, such as asphalt pitch.

Each of the electrode units 33 is configured with a positive electrode 33a containing a positive electrode active material, a negative electrode 33b containing a hydrogen storage alloy, and a separator 33c disposed between the positive electrode 33a and the negative electrode 33b, for allowing ions to pass therethrough, but preventing electrons from passing therethrough. Moreover, the electrode units 33 are stacked in an axial direction (a direction X in FIG. 5) of the outer structural unit 32 and are housed in the outer casing 35. Herein, an electrolyte is retained in the separator 33c. Each of the positive electrode 33a, the negative electrode 33b and the separator 33c has a disc shape with a hole formed at the center. Moreover, an outer diameter of the positive electrode 33a is smaller than an inner diameter of the outer structural unit 32, so that an outer edge 33aa of the positive electrode is not in contact with an inner surface 32aa of the outer structural unit. On the other hand, an outer diameter of the negative electrode 33b is larger than the inner diameter of the outer structural unit 32, so that an outer edge 33ba of the negative electrode is in contact with the inner surface 32aa of the outer structural unit 32, and thus the negative electrode 33b is electrically connected to the outer structural unit 32. Preferably, the outer diameter of the negative electrode 33b is larger by 100 μm than the inner diameter of the outer structural unit 32.

The current collector 37 is made of electrically conductive nickel-plated iron, and has a rod-shaped shaft portion 37a and a hold portion 37b attached to one end of the shaft portion 37a. The shaft portion 37a of the current collector 37 passes through the center of the electrode unit 33 configured with the positive electrode 33a, the negative electrode 33b and the separator 33c, in the axial direction (the direction X in FIG. 5) of the outer casing 35. A diameter of the hole formed on the center of the positive electrode 33a is smaller than an outer diameter of the shaft portion 37a. Accordingly, a peripheral edge 33ab of the hole of the positive electrode comes into contact with the shaft portion 37a, so that the positive electrode 33a is electrically connected to the current collector 37. On the other hand, a diameter of the hole formed on the center of the negative electrode 33b is larger than the outer diameter of the shaft portion 37a. Accordingly, a peripheral edge 33bb of the hole of the negative electrode is not in contact with the shaft portion 37a.

The electrode units 33 are disposed to be sequentially stacked on the hold portion 37b of the current collector. Herein, the hold portion 37b prevents the electrode unit 33 from being disengaged from the end of the current collector 37. Presser plates 34a each made of an insulating material are disposed at two ends of the stacked electrode units 33, and prevent the electrode units 33 from being damaged when the electrode units 33 are stacked and pressed. The presser plate 34a is preferably made of a material which is appropriately used as an insulating material and a structural material, and is made of polypropylene. The hold portion 37b has a disc shape. The hold portion 37b is not in contact with the bulging portion 32b at the bottom of the outer structural unit. Therefore, the hold portion 37b and the outer structural unit 32a are electrically isolated from each other. An opposite end 37c of the shaft portion to the hold portion 37b passes through a hole 36c formed on the center of the lid member 36, and protrudes outward (the right direction in the figure) the lid member 36. The end 37c protruding from the lid member 36 serves as a positive electrode terminal. The outer structural unit 32 serves as a negative electrode terminal.

Hydrogen storage chambers 39 are provided in inward spaces of the bulging portions 32b and 36b. More specifically, the hydrogen storage chamber 39 is disposed on the space, which is formed by the inner surface 32ba, 36ba of the bulging portion and the electrode unit 33, in the outer casing.

The negative electrode 33b contains a hydrogen storage alloy. A charge-capacity of the negative electrode 33b is smaller than a charge-capacity of the positive electrode 33a. Hydrogen gas generated from the negative electrode because of overcharge is stored in the hydrogen storage chamber 39. The hydrogen gas stored in the hydrogen storage chamber 39 is stored by the hydrogen storage alloy, so that the negative electrode 33b is charged.

<Amount of Active Material>

In the layer cell according to the embodiment of the present invention, the positive electrode capacity is 1000 mAh. The negative electrode capacity corresponds to 80% of the positive electrode capacity.

In a negative electrode regulation-type cell, hydrogen gas is generated from a negative electrode in an overcharged state. In other words, charge to 800 mAh or more causes generation of hydrogen gas from the negative electrode (see Reaction Formula (1)). The generated hydrogen gas is stored in the negative electrode. Hydrogen gas which is not stored in the negative electrode is stored in a clearance formed inside the cell. Provision of a hydrogen gas storage chamber in a cell allows the cell to store and accumulate hydrogen gas in a larger amount. When the hydrogen gas to be generated is large in amount, a pressure in the cell rises. Each of the layer cells according to the first to third embodiments adopts a hermetic structure. Therefore, the stored hydrogen gas is not leaked from the cell.

With regard to discharge of the layer cell, hydrogen stored in the negative electrode is discharged as hydrogen ions and electrons from the hydrogen storage alloy. However, the hydrogen gas stored and accumulated in the layer cell is stored in the hydrogen storage alloy, so that the charged state of the negative electrode is maintained (see Reaction Formula (2) at the time of discharge). As described above, the hydrogen gas is not useless because the hydrogen gas is utilized as an energy source at the time of discharge. The hydrogen storage alloy acts as a so-called catalyst. Therefore, a volume change of the negative electrode is small in charge and discharge. This leads to preventing degradation of the negative electrode, and prolonging the lifetime of the cell.

Herein, the electrode plays a role of an electrode that is charged and discharged in a conventional secondary cell. In addition, the electrode also plays a role of an electrode that applies electrolysis to water contained in an electrolyte to generate hydrogen gas.

The price of the negative electrode occupies 80% of the total price of the electrodes, which is expensive. A positive electrode regulation-type cell requires negative electrodes which are 1.7 times as much as positive electrodes. According to the present invention, however, the amount of negative electrodes is reduced to 80% relative to the amount of positive electrodes. Thus, it becomes possible to reduce the price of the electrodes to one-half. Even when the amount of negative electrodes is reduced, a cell capacity is not reduced by using hydrogen gas stored by overcharge.

Fourth Embodiment

Figure 6A:
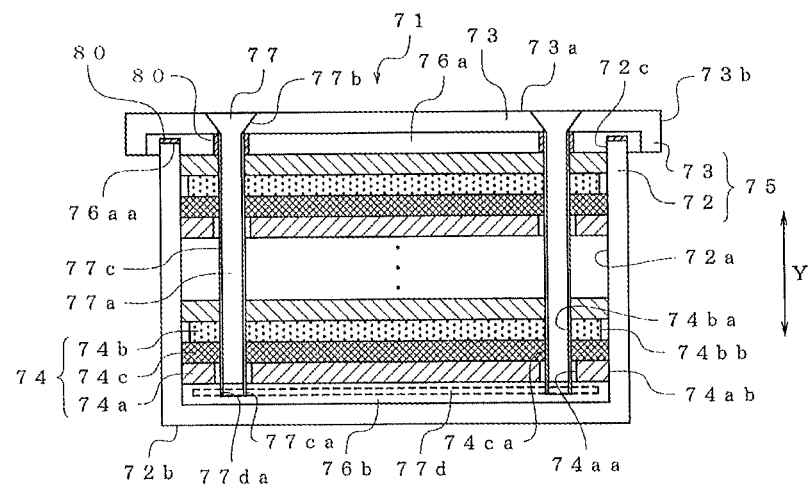
FIG. 6A is a section view illustrating, in an axial direction, a rectangular-type layer cell according to a fourth embodiment.
Figure 6B:
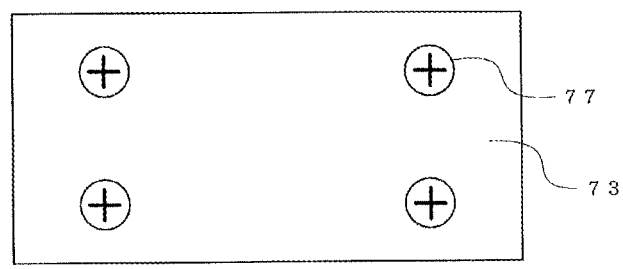
FIG. 6B is a plan view illustrating the rectangular-type layer cell according to the fourth embodiment.

With reference to an axial section view of FIG. 6A, description will be given of a rectangular-type layer cell (hereinafter, simply referred to as a layer cell) according to a fourth embodiment of the present invention. The layer cell 71 includes, as main constituent elements, an outer casing 75, current collectors 77, and electrode units 74 each housed in the outer casing. The outer casing 75 is configured with a body member 72 and a lid member 73. The body member 72 is a one end-closed rectangular container. An opening 72c of the body member 72 is covered with the lid member 73, so that a sealed space can be formed inside the body member 72. Each of the body member 72 and the lid member 73 is made of iron. As illustrated in a plan view of FIG. 6B, the layer cell 71 has a rectangular shape as a whole.

Each of the electrode units 74 is configured with a positive electrode 74a containing a positive electrode active material, a negative electrode 74b containing a hydrogen storage alloy, and a separator 74c disposed between the positive electrode 74a and the negative electrode 74b, for allowing ions to pass therethrough, but preventing electrons from passing therethrough. The separator 74c plays a role to prevent a short circuit between the positive electrode 74a and the negative electrode 74b, and a role to retain an electrolyte. The positive electrode 74a and the negative electrode 74b are stacked in an axial direction (a direction Y in FIG. 6A) of the body member 72 with the separator 74c interposed therebetween, and are housed in the outer casing 75. Each of the positive electrode 74a, the negative electrode 74b and the separator 74c has a sheet shape. An outward dimension of the negative electrode 74b is smaller than an inward dimension of the body member 72, so that an outer edge 74bb of the negative electrode is not in contact with an inner surface 72a of the body member. On the other hand, an outward dimension of the positive electrode 74a is larger than the inward dimension of the body member 72, so that an outer edge 74ab of the positive electrode is in contact with the inner surface 72a of the body member 72 under pressure, and thus the positive electrode 74a is electrically connected to the body member 72. Therefore, since heat generated from the electrode unit 74 is transferred to the body member 72 with a small temperature gradient, rise in temperature of the electrode unit 74 is restrained. Preferably, the outward dimension of the positive electrode 74a is larger by 100 μm than the inward dimension of the body member 72.

Each of the current collectors 77 is made of electrically conductive nickel-plated iron. Moreover, the current collector 77 has an inverted conical-shaped countersunk portion 77b and a shaft portion 77a following the countersunk portion 77b, and takes a form of a countersunk screw as a whole.

The electrodes 74b and 74a have holes 74ba and 74aa through which the shaft portion 77a of the current collector 77 passes, respectively. A diameter of the hole 74ba formed on the negative electrode 74b is smaller than an outer diameter of the shaft portion 77a, so that the negative electrode 74b comes into contact with the shaft portion 77a and thus the negative electrode 74b is electrically connected to the current collector 77. On the other hand, a diameter of the hole 74aa formed on the positive electrode 74a is larger than the outer diameter of the shaft portion 77a, so that the positive electrode 74a does not come into contact with the shaft portion 77a.

The four current collectors 77 (see FIG. 6B) are coupled to one another via a coupling plate 77d located under the electrode units 74. In other words, a screw portion 77c formed at a lower end 77ca of the current collector is screwed into a screw hole 77da formed on the coupling plate 77d, so that the current collector 77 is coupled to the coupling plate 77d. The electrode units 74 are disposed to be sequentially superposed on the coupling plate 77d, and the coupling plate 77d prevents the electrode units 74 from being disengaged from the end of the current collector 77. An insulating plate 76b is disposed between the bottom 72b of the body member and the coupling plate 77d to prevent an electrical short circuit between the current collector 77 and the body member 72 because of the contact of the coupling plate 77d with the bottom 72b of the body member. Specifically, the coupling plate 77d is surrounded with the insulating plate 76b made of polypropylene.

The lid member 73 has a flat plate portion 73a and a bent portion 73b which is bent at a right angle from the flat plate portion. An insulating plate 76a is disposed inward the bent portion 73b and on the opening 72c of the body member. The insulating plate 76a prevents an electrical short circuit between the uppermost electrode unit 74 and the lid member 73. A groove 76aa is formed on the opposite surface of the insulating plate 76a to the lid member 73 such that an outer edge of the opening of the body member 72 is fitted thereinto. A seal member 80 made of asphalt pitch is disposed between the groove 76aa and the outer edge of the opening of the body member 72 so as to keep the hermeticity inside the outer casing 75. For the similar purpose, the seal member 80 made of asphalt pitch is also disposed on the hole, through which the shaft portion 77a of the current collector passes, in the insulating plate 76a.

The lid member 73 is connected to the coupling plate 77d by the current collector 77 acting as a countersunk screw. The body member 72 serves as a positive electrode terminal, and the lid member 73 serves as a negative electrode terminal.

<Assembled Battery>

Figure 7:
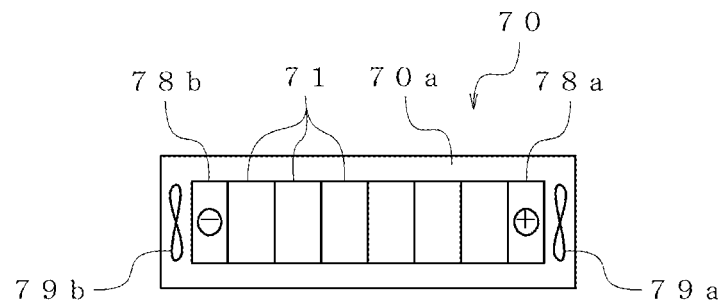
FIG. 7 is a diagram illustrating a configuration in a case where an assembled battery is configured with the rectangular-type layer cell according to the fourth embodiment.

FIG. 7 is a diagram illustrating a schematic configuration in a case where an assembled battery 70 is configured with a plurality of layer cells 71. These layer cells 71 are connected in series in such a manner that the flat plate portion 73a of the lid member in one of the layer cells 71 is opposed to and is brought into surface contact with the bottom 72b of the body member in the adjacent layer cell. The layer cells 71 connected in series are sandwiched between a positive electrode terminal board 78a and a negative electrode terminal board 78b to form the assembled battery 70. More specifically, the positive electrode terminal board 78a that comes into surface contact with the body member 72 and the negative electrode terminal board 78b that comes into surface contact with the lid member 73 are disposed inside a housing 70a. Then, the plurality of layer cells 71 is housed between the positive electrode terminal board 78a and the negative electrode terminal board 78b to form the assembled battery 70. External cool air is supplied into the housing 70a by a suction fan 79a and a forced draft fan 79b to cool the assembled battery 70. An output from the assembled battery 70 is extracted from the positive electrode terminal board 78a and the negative electrode terminal board 78b to the outside through a cable (not illustrated).

Fifth Embodiment

Figure 8:
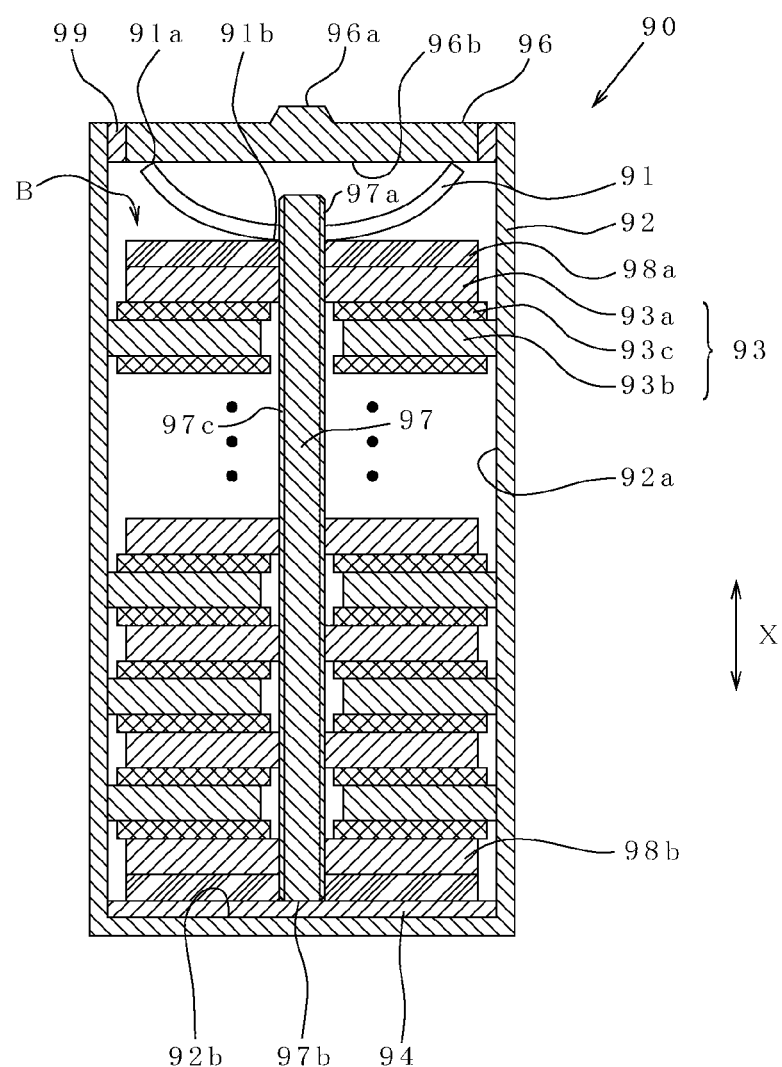
FIG. 8 is a section view schematically illustrating, in an axial direction, a cylindrical-type layer cell according to a fifth embodiment of the present invention.

FIG. 8 is a section view schematically illustrating, in an axial direction, a cylindrical-type layer cell (hereinafter, simply referred to as a layer cell) according to a fifth embodiment. The layer cell 90 includes, as main constituent elements, a cylindrical can 92, a current collector 17, and electrode units 93 each housed in the cylindrical can. Each of the electrode units 93 is configured with a positive electrode 93a, a negative electrode 93b, and a separator 93c disposed between the positive electrode 93a and the negative electrode 93b.

The electrode units 93 are disposed to be sequentially superposed on a presser plate 98b located under the current collector 97, and the presser plate 98b prevents the electrode units 93 from being disengaged from an end of the current collector 97. The presser plate 98b is a nickel-plated steel plate having a disc shape. A presser plate 98a is disposed on the uppermost one of the stacked electrode units 93, and the electrode units 93 can be compressed by the presser plates 98a and 98b.

The electrode units 93 are inserted into the cylindrical can 92 in an axial direction (a direction X in FIG. 8) of the cylindrical can 92. An outer diameter of the positive electrode 93a is smaller than an inner diameter of the cylindrical can 92, so that an outer edge 93ab of the positive electrode does not come into contact with an inner surface 92a of the cylindrical can. On the other hand, an outer diameter of the negative electrode 93b is larger than the inner diameter of the cylindrical can 92, so that an outer periphery 93bb of the negative electrode comes into contact with the inner surface 92a of the cylindrical can 92 and the negative electrode 93b is electrically connected to the cylindrical can 92. An upper opening of the cylindrical can 92 is covered with a lid member 96. An insulating member 99 is disposed between the lid member 96 and the cylindrical can 92 to prevent an electrical short circuit due to the contact of the lid member 96 with the cylindrical can 92.

An insulating sheet 94 is disposed on the bottom 92b of the cylindrical can to prevent an electrical short circuit between the current collector 97 and the cylindrical can 92 from occurring because one end 97b of the current collector directly comes into contact with the bottom 92b of the cylindrical can. A connecting plate 91 which has a shape of a plate bowed downward and is made of an elastic material is attached to the other end 97a of the current collector. An end 91a of the connecting plate comes into contact with a bottom surface 96b of the lid member, and is forced downward by the lid member 96. Thus, the current collector 97 and the lid member 96 are electrically connected to each other via the connecting plate 91.

A projection 96a formed on the center of the lid member 96 serves as a positive electrode terminal. Moreover, the cylindrical can 92 serves as a negative electrode terminal.

This embodiment is different from each of the foregoing embodiments with regard to part of the structure of the current collector. Hereinafter, description will be given of the point of difference.

Figure 9:
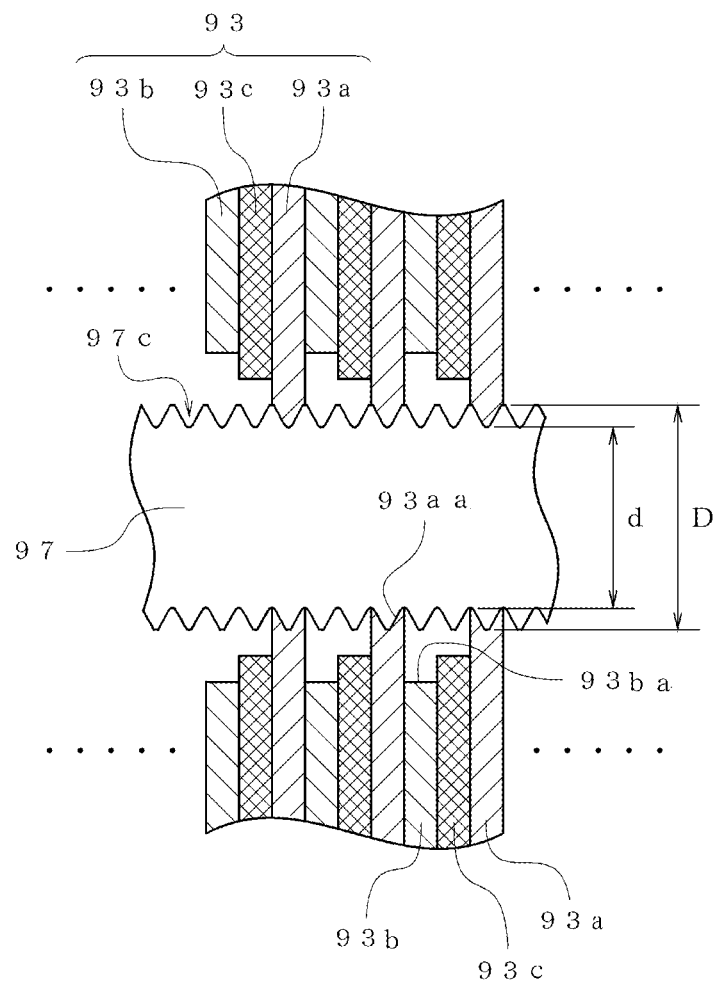
FIG. 9 is a section view schematically illustrating a screw structure of a current collector.

FIG. 9 is a partial section view schematically illustrating a relation between the current collector 97 and the electrode unit 93. As illustrated in FIG. 9, the current collector 97 has a side surface formed as a screw portion 97c that includes screw grooves in which the root has a diameter d and the crest has a diameter D (d<D).

As illustrated in FIG. 9, a diameter of a hole 93aa formed on the positive electrode 93a is smaller than the diameter (d) of the root of the screw portion 97c, so that the positive electrode 93a is screwed into the shaft portion 97a of the current collector and firmly comes into contact with the current collector 97. Thus, the positive electrode 93a is electrically connected to the current collector 97. On the other hand, a diameter of a hole 93ba formed on the negative electrode 93b is larger than the diameter (D) of the crest of the screw portion 97c, so that the negative electrode 93b does not come into contact with the shaft portion 97a of the current collector. Thus, the negative electrode 93b is electrically isolated from the current collector 97.

It becomes possible to satisfactorily ensure the contact between the positive electrode 93a and the current collector 97 in such a manner that the diameter of the hole formed on the positive electrode 93a is made smaller than the outer diameter of the root of the screw portion of the current collector 97. The screw grooves formed on the current collector 97 prevent the coupling between the current collector and the electrode from being loosened at the time of assembly of the electrode, and ensure the tight contact between the current collector and the electrode. That is, a firmly fitted state is maintained in such a manner that the positive electrode 93a is fitted along the screw portion formed on the current collector 97. Thus, it becomes possible to ensure the contact state of the electrode with the current collector even when the electrode becomes deformed by charge and discharge. Herein, the current collector having the screw grooves is also applicable to the first to fourth embodiments in addition to this embodiment.

Figure 10:
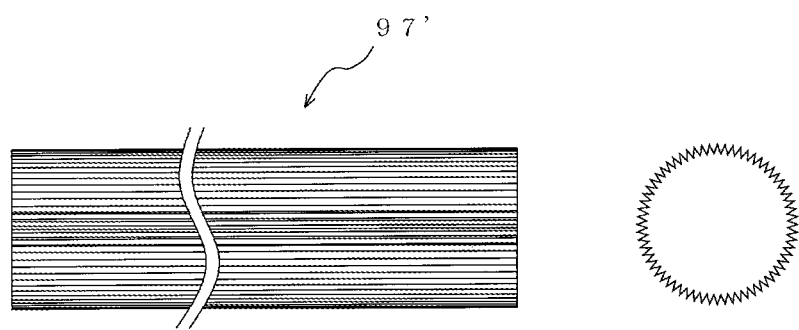
FIG. 10 is a diagram illustrating an embodiment in which the current collector has a structure other than the screw structure.

FIG. 10 is a plan view (the left side in FIG. 10) and a side view (the right side in FIG. 10) illustrating a current collector according to another embodiment. The current collector 97' has a side surface on which V-shaped grooves are entirely and circumferentially formed in an axial direction, and a section thereof has a sawtooth shape. Since the section of the current collector has the sawtooth shape, a contact area of the current collector with the electrode becomes large. When the electrode is brought into tight contact with the current collector in the axial direction under pressure, then, the electrode slides along the grooves formed on the current collector. As the result, a contact failure between the electrode and the current collector is less prone to occur. Even when the electrode becomes deformed in the course of charge and discharge, the electrode is not damaged because the electrode slides along the grooves of the current collector.

Figure 11:
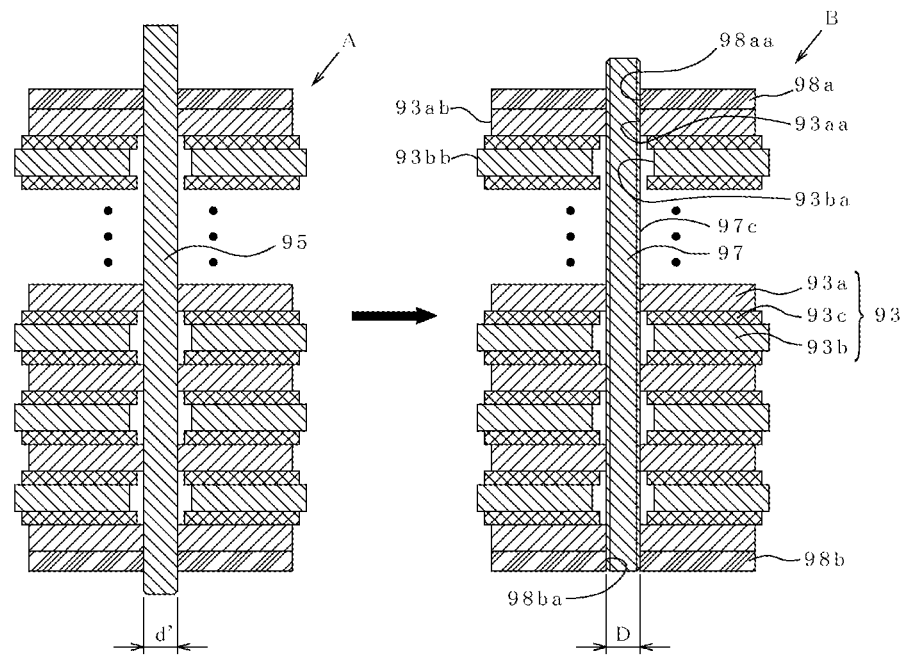
FIG. 11 is a section view illustrating, in an axial direction, a method for assembling the layer cell.

With reference to FIG. 11, next, description will be given of a method for assembling the layer cell according to the present invention. The electrode units 93 are stacked in such a manner that the positive electrode 93a and the negative electrode 93b are sequentially inserted, with the separator 93c interposed therebetween, into a round rod 95 having an outer diameter (d') which is slightly smaller than the root of each of the screw grooves formed on the side surface of the current collector 97. Next, the electrode units 93 are stacked in predetermined sets, and the presser plates 98a and 98b are disposed beside the two ends of the electrode units 93, respectively, to hold the electrode group, so that an electrode current collector A is assembled (see the left side in FIG. 11).

Next, the electrode group is compressed with the presser plates 98a and 98b, and the round rod 95 is pulled out while the compressed state is maintained. In place of the round rod 95, the current collector 97 is pushed into the electrode group, which is held by the presser plates 98a and 98b and to which pressure is applied, while being rotated. Next, the presser plates 98a and 98b are screwed into the current collector 97, and an electrode assembly B is assembled in a state that the electrode group is continuously compressed (the right side in FIG. 11).

Next, the electrode assembly B is put into the cylindrical can 92 under pressure, the cylindrical can 92 is subjected to deaeration, and the electrolyte is injected into the cylindrical can 92. After the injection of the electrolyte, the lid member 96 is attached onto the opening of the cylindrical can 92 and the opening of the cylindrical can 92 is caulked, so that the layer cell is hermetically sealed.

<Test Results>

The layer cell according to the fifth embodiment of the present invention was charged in a rate of 0.5 C to 8 C and, after the full charge, the internal temperature and surface temperature of the layer cell were measured. With regard to a temperature measurement method, the internal temperature was measured in such a manner that a thermocouple is attached to the center of the current collector. Moreover, the surface temperature was measured in such a manner that a thermocouple is attached to a surface of the outer casing of the layer cell. Herein, the measurement was performed in a state that a room temperature is set at 15° C. and 1 m/s air is blown on the layer cell by a fan.

Table 1 shows results of measurement of a cell temperature after the layer cell is charged such that the SOC is 100% at each charge rate (0.5 C, 1 C, 2 C, 5 C, 8 C). In Table 1, the left column shows the largest value of a difference between the cell surface temperature and the room temperature (=measured temperature−room temperature), and the right column shows the largest value of a difference between the cell internal temperature and the room temperature (=core temperature−room temperature). At each of the charge rates, the difference between the cell temperature and the room temperature rapidly rose when the SOC exceeds 80%. At the charge rate of 2 C or less, each of the differences in temperature of the cell (measured temperature−room temperature, core temperature−room temperature) was less than 5° C. At the charge rate of 8 C, each of these differences in temperature was less than 30° C.

TABLE 1

| | Maximum temperature difference | |
|---|---|---|
| Charge rate | Measured temperature − Room temperature (° C.) | Core temperature − Room temperature (° C.) |
| 0.5 C | 1.57 | 2.3 |
| 1 C | 2.2 | 3.1 |
| 2 C | 2.27 | 4.2 |
| 5 C | 6.87 | 11.7 |
| 8 C | 13.8 | 28.7 |

Figure 12:
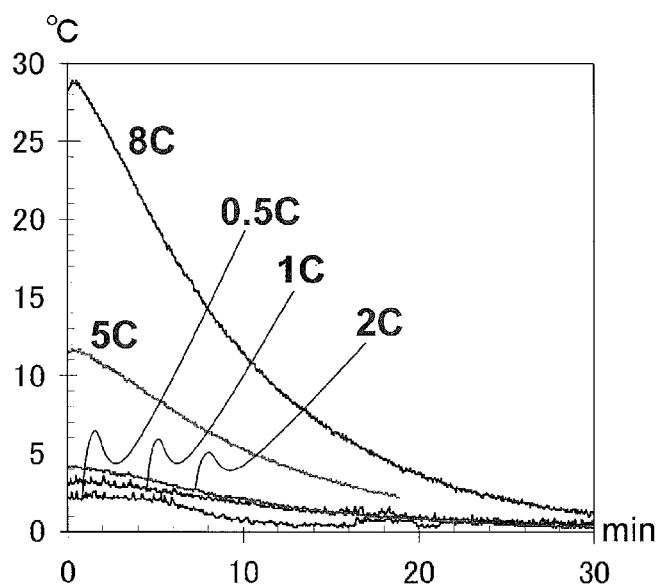
FIG. 12 is a graph showing results of a temperature rise test on the layer cell.

FIG. 12 is a graph illustrating the difference between the cell internal temperature after the charge and the room temperature with the values of the respective charge rates taken as parameters. In FIG. 12, the vertical axis indicates a temperature difference scaled on a Celsius basis, and the horizontal axis indicates an elapsed time scaled on a minute basis. It is apparent from the graph that the difference between the cell internal temperature and the room temperature (temperature rise) at the charge rate of 2 C or less is 4° C. or less, which is considerably small. The reason therefor is considered to be as follows. That is, heat is not accumulated in the cell because the heat generation by the charge and the heat dissipation are well balanced.

It is understood that there is a difference between the cell internal temperature and the room temperature at the charge rate of 5 C and the charge rate of 8 C. However, the difference between the cell internal temperature and the room temperature decreases to less than 5° C. in less than 20 minutes. It is apparent from this result that the cell is considerably excellent in heat dissipating property.

It was apparent from the test results that the layer cell according to the present invention is large in internal thermal conductivity and the cell internal temperature is lowered in a short time even when the temperature rises because of the charge.

INDUSTRIAL APPLICABILITY

The layer cell according to the present invention can be suitably used as a consumer power storage apparatus in addition to an industrial power storage apparatus.

REFERENCE SIGNS LIST

11 Cylindrical-type layer cell
12 Cylindrical can (a: inner surface of side portion)

13 Electrode unit (a: positive electrode, b: negative electrode, c: separator)
14 Insulating plate
15 Outer casing
16 Lid member
17 Current collector (a: shaft portion, b: hold portion, c: positive electrode terminal)
19 Hydrogen storage chamber
20 Assembled battery
21 Pipe-type layer cell
22 Round pipe
23 Electrode unit
24 Insulating member
25 Outer casing
26 Lid member
27 Current collector
29 Metal fitting
31 Capsule-type cell
32 Outer structural unit (a: side portion, b: bulging portion)
33 Electrode unit (a: positive electrode, b: negative electrode, c: separator)
35 Outer casing
36 Lid member
37 Current collector (a: shaft portion, b: hold portion, c: end)
38 Insulating seal member
39 Hydrogen storage chamber
70 Assembled battery
71 Rectangular-type layer cell
72 Body member
73 Lid member
74 Electrode unit
75 Outer casing
76 Insulating plate
77 Current collector
79 Fan
91 Connecting plate
92 Cylindrical can
93 Electrode unit
94 Insulating sheet
95 Round rod
96 Lid member
97 Current collector
98 Presser plate
99 Insulating member

The invention claimed is:

1. A method for assembling a layer cell, comprising:
a first step of previously preparing a current collector having a side surface on which a screw groove is formed, and a round rod having the same outer diameter as a diameter of a root of the screw groove on the current collector;
a second step of assembling an electrode group in such a manner as to sequentially insert a positive electrode and a negative electrode into the round rod with a separator interposed between the positive electrode and the negative electrode and stack the electrodes;
a third step, to be carried out subsequent to the second step, of disposing presser plates on two ends of the electrode group to hold the electrode group and applying pressure to the presser plates to compress the electrode group;
a fourth step of pulling out the round rod while maintaining the compressed state;
a fifth step of pushing the current collector instead of the round rod into the electrode group while rotating the current collector, and then screwing the current collector into a screw hole formed on the center of the presser plate to assemble an electrode assembly while maintaining the compressed state of the electrode group;
a sixth step of putting the electrode assembly into the outer casing under pressure;
a seventh step of deaerating the outer casing;
an eighth step of injecting an electrolyte into the outer casing; and
a ninth step, to be carried out subsequent to the eighth step, of attaching a lid to the outer casing to seal the outer casing.

* * * * *